Patented Jan. 12, 1926.

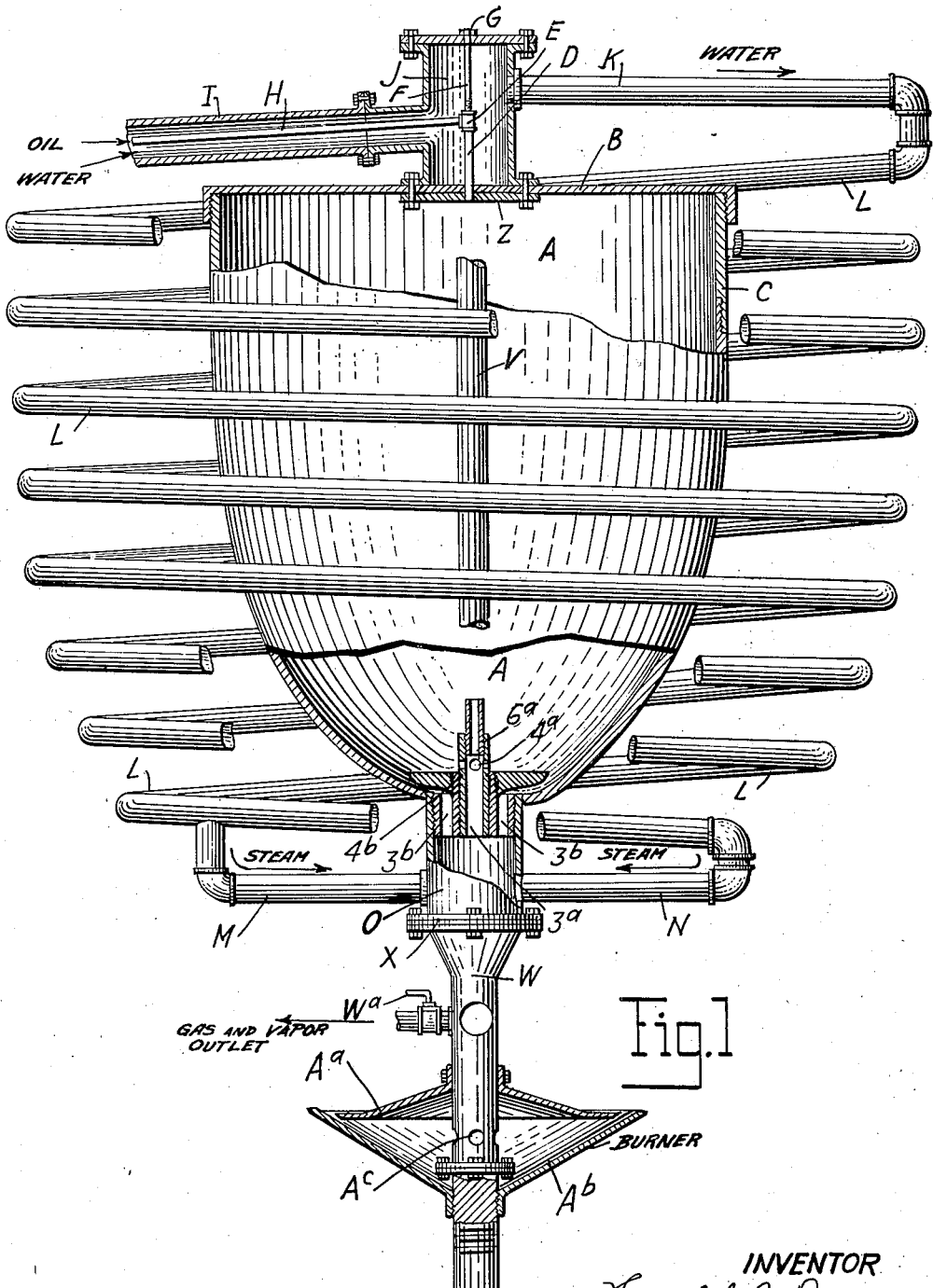

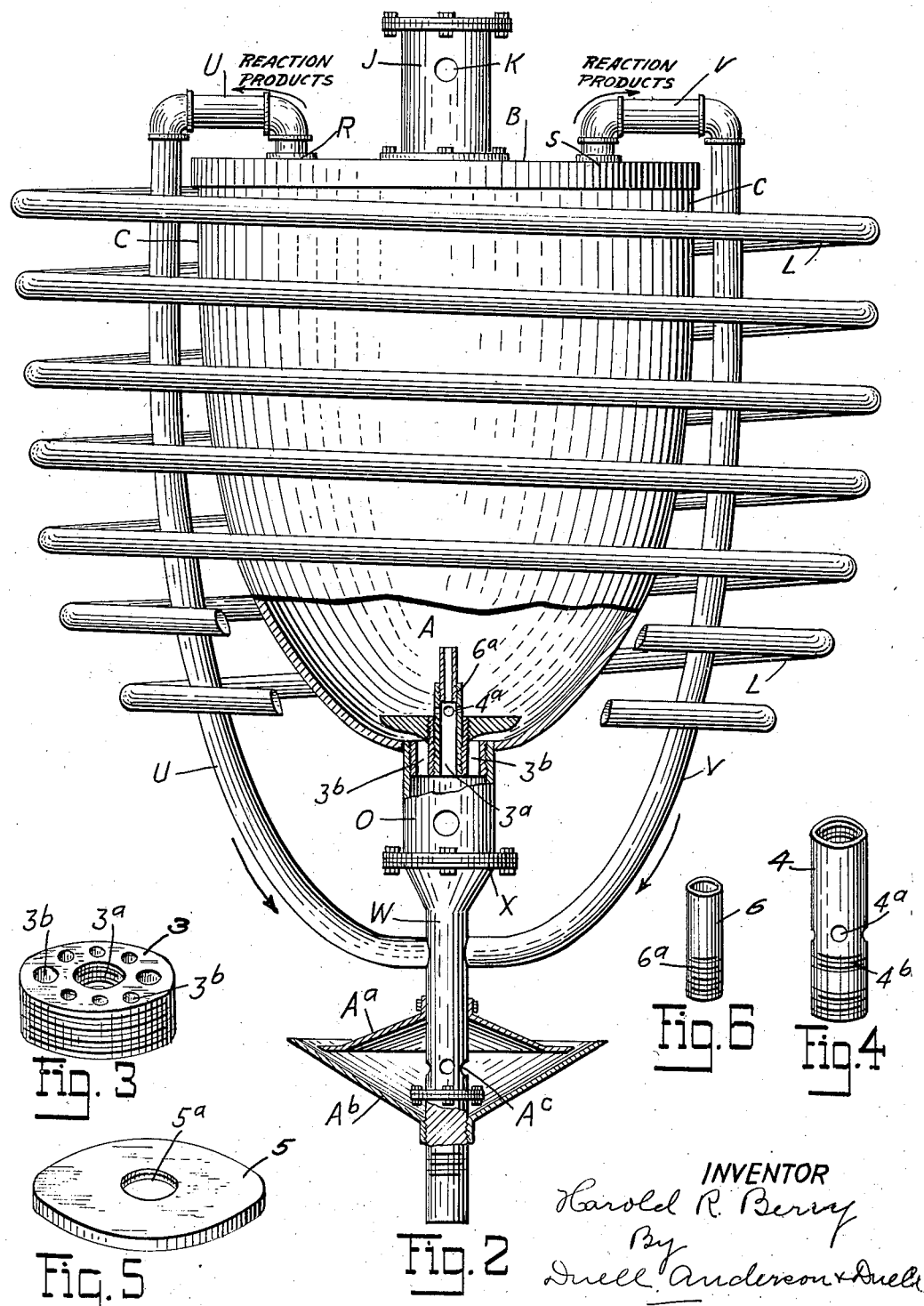

1,569,532

UNITED STATES PATENT OFFICE.

HAROLD R. BERRY, OF BROOKLYN, NEW YORK, ASSIGNOR TO THE DYNAMICS CORPORATION OF AMERICA, OF NEW YORK, N. Y., A CORPORATION OF DELAWARE.

HEAT TREATMENT OF HYDROCARBONS.

Application filed December 6, 1924. Serial No. 754,284.

*To all whom it may concern:*

Be it known that I, HAROLD R. BERRY, a citizen of the United States, residing at Brooklyn, in the county of Kings and State of New York, have invented certain new and useful Improvements in the Heat Treatment of Hydrocarbons, of which the following is a full, clear, and exact description, such as will enable others skilled in the art to which it appertains to make and use the same.

The object of this invention is a process for the regulation and control of the reactions of water and oil into resultant gases and vapors.

The process presented may be employed in various fields of manufacture and operation in which the combustion of and the derivation of products from oil forms a factor.

In the oil refinery, where crude oil is not only topped and fractionated, but heavy fractions, by cracking, are converted into lighter, use of the process is had by reaction of carbon, customarily precipitated, into oxides coincidentally with hydrogenization of the hydrocarbon compounds.

In the manufacture of heating and illuminating gas from petroleum or its heavy fractions, use of the process is had, by oxidization of carbon customarily precipitated through cracking of the oil to make the gas. Thermal recovery in the gas is greatly increased over present practice, by which scarcely half of the thermal content of the oil is recovered in the gas produced.

Further application of the process to the gas making art is had in the manufacture of carburetted water gas. For the present method of checker brick cracking of oil fractions to obtain oil-gas for enrichment, direct reaction of oil and steam into enriching gas is prescribed with the conversion of carbon into its combustible oxide before the carbon can precipitate.

In the combustion of oil for heat producing purposes, the process prescribes vaporization and gasification of the oil intsead of atomization by steam and oil nozzles. By the use of specially designed mechanisms adaptation of the process may be had in the fields of locomotive, marine, and stationary boiler practice.

Adaptation of the process is shown in a compact apparatus fully comprehending, however, the regulations and controls entering into the process claims.

The general principles and reactions governing the invention and the methods for their control and adaptation are found to function not only in their large application to the gas plant and oil refinery, but, by suitable arrangement, application is had in a unit so reduced that its use as an oil converter, a gas maker and a fuel burner is presented.

Important and novel combinations are shown governing familiar gas making reaction; and an illustrative unit is described, serviceable as a burner, incorporating the use of the disclosures, which permits the conducting of gas made away from the place of manufacture for use elsewhere.

The process involves the reaction of carbon and steam into carbon monoxide, carbon dioxide and hydrogen, and also severed valence and hydrogenization of hydrocarbons into lighter fractions.

Combustion of gases produced yields heat values greatly in excess of reaction requirements thereby affording large available heat quantities for steam making and heat requiring uses. Gases combusted by the illustrated burner shown, are in the heated condition incident to their manufacture, thereby increasing normal thermal recovery. The process eliminates carbon precipitation due to the cracking temperature of heavy petroleum fractions being lower than their boiling points and also prevents carbon deposit produced by high temperatures from lighter fraction. Conditions are established so that carbon potentially precipitatable by cracking is reacted into carbon oxides.

Initial delivery of the oil in liquid phase into reaction with steam is prescribed under heat and other suitable conditions so established that the reaction to carbon monoxide and dioxide ensues. The process substitutes true gas and vapor formation for sprays, emulsions, mists and fogs and prescribes no oil vaporization prior to steam contact. Such contact is had at temperatures insuring reactions to carbon monoxide and dioxide as substitutions for carbon deposit from the oil. The process contemplates manufacture of water gas from oil and water and enrichment thereof with hydrocarbons; and a method for reaction heat requirements to be supplied by combustion of gases generated is shown.

Reference is made to the fact that heavy hydrocarbon compounds crack at temperatures below their boiling points. For instance, pentacosane, a paraffine, cracks at about 550 degrees Fah. Its boiling point is about 788 degrees Fah., with unsaturated compounds the variance is even more marked.

Thus, it is readily apparent that to vaporize such a compound as pentacosane, namely; raise its temperature to 788 degrees Fah. the oil becomes hotter than its cracking temperature of about 550 degrees Fah., and to attain a vaporizing temperature it must exceed its cracking temperature and crack with accompanying carbon deposit.

The average oil used for burning purposes contains from 25 per cent upwards to 60 per cent and 70 per cent of like heavy compounds. Because of the reasons given, crude oil and its fuel oil fractions, cannot be vaporized and then in vapor phase contacted with steam for gas and vapor making reactions without carbon deposit along the oil delivery line. The process presented eliminates carbon deposit due to the above causes and as the result of other causes later shown. As an aid to this presentation certain approximate temperatures may be used illustratively, as incident to the heat treatment of oil containing heavy fractions, viz:

|  | Degrees Fah. |
|---|---|
| Cracking point, for instance, | 500 |
| Boiling point, for instance, | 750 |
| Temperature required for carbon reaction with oxygen of steam, for instance | 1250 |

With such fractions as are referred to above, fractions whose boiling points are higher than their cracking temperatures, if contact, in vapor phase with steam quantities is prescribed for gas and vapor formation, carbon precipitation must occur prior to vaporization. Regarding lighter hydrocarbons whose boiling points are below their cracking points the foregoing observation will not apply. Fractions whose boiling points are lower than their cracking temperatures, of necessity, vaporize before cracking and, therefore, such lighter fractions appear as vapors for reaction with steam without having deposited carbon prior to vaporization. But such lighter fractions contacting steam of a temperature approximate with their boiling points, do so without avail so far as reaction with the steam is concerned. Steam is a thoroughly stable compound contacting carbon or hydrocarbon at any such temperatures as the boiling points of the hydrocarbons. Mists and sprays, with the steam serving as carrier, occur, but not gas and reacting vapor making reactions.

Sufficient increase in temperature of such a mixture of oil vapor and steam results in cracking and carbon precipitation. Vapor phase cracking is as familiar to the cracking art as is liquid phase cracking.

The steam is unavailing to prevent carbon deposit unless it is hot enough to react to CO and $CO_2$ with consequent hydrogen release. Long before any such steam temperature is encountered, excepting possibly with the lightest of the gasoline series, every possible hydrocarbon constituent of the oil, has encountered its cracking point and deposited carbon.

Thus, for the reaction of oil with steam into gas or light fraction vapors without carbon deposit, the oil must be at a temperature below the cracking point of its heaviest fractions, until contacting the steam and the steam must be hot enough to support the reactions to CO and $CO_2$, reacting instead of depositing released carbon.

A number of elementary facts are recognized as the basis for the operation of the process.

(a) The saturated series of hydrocarbons contains a larger percentage of hydrogen by weight than any other group. Family symbols readily indicate the fact.

| | |
|---|---|
| Paraffins | $C_n + H_{2n+2}$ |
| Olefines | $C_n + H_{2n}$ |
| Acetylenes | $C_n + H_{2n-2}$ |
| Terpenes | $C_n + H_{2n-4}$ |
| Benzenes | $C_n + H_{2n-6}$ | etc.

In the direction away from paraffins, each group contains two less hydrogen atoms compared with the carbon incorporation than the preceding group.

(b) That within the paraffin group each compound has a characteristic or fixed percentage of hydrogen; that no two compounds possess the same comparative ratio of hydrogen content; and that as compounds of the series possess increased hydrogen content they present reduced gravities and boiling points, viz:

| Compound. | Hydrogen %. | Sp. Gr. | b. p. C. |
|---|---|---|---|
| $C_{20} H_{42}$ | 14.8 | 0.778 | 341° |
| $C_{15} H_{32}$ | 15.1 | .776 | 270° |
| $C_{10} H_{22}$ | 15.3 | .747 | 173° |
| $C_8 H_{18}$ | 16.7 | .645 | 36° |
| $C_4 H_{10}$ | 17.2 | .6 | 1° |
| $C_3 H_8$ | 18.2 | .536 | −37° |
| $C_2 H_6$ | 20.0 | .446 | −84° |
| $C H_4$ | 25.0 | .415 | −164° |

Under the conditions established for operation of this process, part of the carbon of the oil supplied is reacted with oxygen of steam into carbon monoxide and the varying amount of carbon dioxide always present in such reactions; and hydrogen of the steam, so released, enters into chemical combination with the unstabilized hydrocarbons present, from which compounds a portion of the carbon has been abstracted to permit the carbon oxide reactions.

Thus, with increase of hydrogen percentage in the molecule of the hydrocarbon, progression is shown in the family grouping from heavy series to light series, the saturated series being the ultimate. And within the paraffin series, increase of the hydrogen percentage of the molecule shows progression from the heavy to the light compounds of the series, with gas as the ultimate.

When the boiling point of a compound is below atmospheric conditions it is a gas; when above, a liquid. Hydrocarbons occurrent in petroleum may be converted into gas and lighter liquid compounds by sufficient increase of the hydrogen content and when with decreased gravity the boiling point is lowered below atmospheric conditions a fixed gas is the product. This may be accomplished in the two ways indicated by adding hydrogen to the compound and by taking carbon away from the compound.

In the process presented both operations occur. Operative regulations are that oil must be delivered into contact with steam at a temperature below the cracking temperature of its heavy fractions; and the temperature of the steam, so contacting, must be elevated to reaction temperature. The primary reaction is between oxygen of the steam and carbon of the oil. The hydrogen of the steam thus released, by severance of its bond with the reacted oxygen, enters unstabilized hydrocarbon molecules. Though the oil, prior to entry, into the reaction zone is maintained at a temperature below the cracking point of its heavy compounds, nevertheless, upon entry into the zone a temperature far in excess of cracking temperatures is encountered, and cracking, of necessity, must follow with accompanying carbon release.

The infinitesimal particles of carbon so released have no opportunity for either accumulation or deposit. The release of the carbon particle from the hydrocarbon molecule, due to the cracking, occurs under conditions of ideal contact with steam reactively hot; thus, oxygen is released from its hydrogen bond for union with the released carbon particle, producing thereby one or both of the carbon oxides.

Thus, water gas results under conditions of ideal contact. The hydrocarbon is reduced in gravity and its boiling power lowered by loss of the carbon and consequent increase of hydrogen content, which increase is further augmented by incorporation into the unstabilized molecule of hydrogen released from its oxygen union.

The first reaction mentioned results in producing carbon monoxide with oxygen from the steam and carbon from the oil, thus reducing the carbon content of the oil and inversely increasing the hydrogen percentage thereof.

The second reaction involves the hydrogen so released from its oxygen combination in new unions with hydrocarbons present.

For instance, ethyl toluene $C_9H_{12}$, Sp. gr. .867, b. p. 162° C., is a moderately heavy unsaturated hydrocarbon of the benzene series, containing by weight 10% hydrogen. To produce fixed combustible gas from this compound and steam, requires great increase in the relative amount of hydrogen incorporated and involves fixed chemical reactions of part of the carbon of the compound into carbon monoxide and hydrogenization, by true reaction, of the remainder. Both the oxygen and hydrogen required for the reactions are made available from steam quantities supplied; and by the process presented the steam is supplied in such manner as to produce the reactions.

The detailed symbol for the compound considered, ethyl toluene, $C_9H_{12}$ is $C_6H_4$: $C_2H_5$; $C.H_3$ (Engler-Höfer: K. von Anwers Ann., 419, 92–120, 1919).

The addition of $3H_2O$ to this compound, in the manner contemplated by this process, presumably results in the direct reaction of 3 of the carbon atoms from $C_6H_4$ with the 3 atoms of oxygen from the water, yielding $3CO + C_3H_4$, an isoprene of allene, unstable and not isolated. The six atoms of hydrogen released from their oxygen union, react as follows: four with the $C_3H_4$ into $C_3H_8$, propane, one with the $C_2H_5$ into $C_2H_6$ ethane, and one with $CH_3$ into $CH_4$ methane. The reaction may be symbolized as follows, excepting that in all probability an even multiple figures, permitting hydrogen to function in its molecular condition and the reaction, $CO_2 + C = 2CO$, to occur. The reaction may be symbolized as follows:

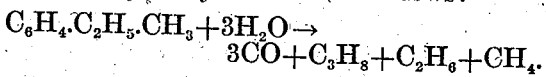

$$C_6H_4.C_2H_5.CH_3 + 3H_2O \rightarrow 3CO + C_3H_8 + C_2H_6 + CH_4.$$

In most illustrations, as in the foregoing, no reckoning will be made of the varying amounts of carbon dioxide occurrent in reactions, as the thermal value of the resulting gas is little affected. With adequate steam quantities supplied, double the quantity of hydrogen is released in the case of a specific weight of carbon reacting to $CO_2$ as in the reaction to carbon monoxide and the additional hydrogen in combustion practically offsets the lack of thermal value in the $CO_2$. The temperature regulations are familiar. Slight incipient reaction between oxygen of steam and carbon may be expected at about 800° F. reactive potency increasing with temperature, until between 1400° F. upwards to 2000° F. vigorous and rapid formation of carbon oxides occurs.

The lower the temperature the greater is the relative production of dioxide compared with monoxide, and the contrary holds; maintenance of operating heat conditions in excess of 1800° F. reducing carbon dioxide under three per cent.

Steam and temperature regulations of the process eliminate carbon deposit resulting from application of vaporization heats to oil fractions which have lower cracking points than boiling points. Also these regulations insure true gas and vapor reactions with no delivery of mists, or sprays at the point of combustion.

Summarized, to avoid carbon precipitation due to cracking, heavy oil must be delivered into steam contact in liquid phase as vaporization cracks compounds whose cracking temperatures are below their boiling points.

Steam contact must be had with the temperature of the steam at or above that required for its reaction. Otherwise, it merely imparts heat to the oil, and raising the temperature of the steam and oil after contact, in mixture, cracks the oil in vapor phase as the steam is not reactive to prevent carbon deposit by the formation of oxides, until a temperature far in excess of the cracking temperature of the oil is attained.

Non-observance of these regulations and failure to supply sufficient contact between the quantities, produce tar and lamp black incident to gas making operations.

*Description of apparatus and its functions.*

In the accompanying drawings there are shown different views of an assembled apparatus and enlargement of certain parts, constituting a mechanism and method for operation of the process presented. It is understood that any departure from the apparatus as shown which permits the operation of the process disclosed, is within the claims of the invention. The accompanying drawings show but a single apparatus and method for adaptation and use of the process presented and any mechanism and method by which the process is operatable is within the scope of the specification and claims hereof.

In the accompanying drawings:

Fig. 1 is a diagrammatic view, partly in cross section, of an apparatus operative by the process presented. Certain pipes and connections are not shown to simplify later explanation.

Fig. 2 is the same structure as Fig. 1, viewed from a point at right angle with the line of observation used in Fig. 1. Pipes and connections not shown in Fig. 1 are shown in Fig. 2.

Figs. 3—4—5 and 6 are enlargements of parts shown assembled in Fig. 1 and Fig. 2.

Like reference numerals indicate corresponding parts in the different figures of the drawings.

A is a reaction chamber of any suitable construction; in the accompanying drawings it is shown as the interior of a hollow semi-ellipsoid, C, with the flat circular plain at the top. It is a shell and is made of such thickness and material as will serve the duties imposed by operation of the process.

B is a cap which forms the top of reaction zone A and in the drawings is shown as attached to and screwed about C.

The cap B is provided with an orifice into which is introduced pipe D, Fig. 1, which is connected with T E to pipe F, which pipe F is threaded on its interior face approximately its entire length to the T E.

G, Fig. 1, is a bolt passing through pipe F and affording rigidity to the pipe length formed by pipe D T E and pipe F.

H is a pipe connecting with the side outlet of T E.

I is a pipe connecting with the special T J, through which pipe passes the smaller line pipe H.

Exit from special T J is afforded by pipe K, which connects with coil L. The terminus of coil L is at its bottom part where it is connected by pipes M and N, with a special double sweep T O. T O is attached to the shell C and forms part of its bottom. The special construction within T O is shown by enlargements, Figs. 3—4—5 and 6.

Fig. 3 shows a cylinder 3 of low altitude compared with its diameter which diameter is equal to the inside diameter of the exit from special T O.

Cylinder 3 is equipped with a central orifice 3ª and surrounding orifices 3ᵇ. It is assembled by screwing the unit into the top of T O, and when in place its top surface is in continuity with the interior surface of shell C.

Fig. 4 shows a pipe 4, whose outside diameter is equal the diameter of 3ª, the centrally located orifice of cylinder 3.

Pipe 4 at its bottom is equipped with threads as is the continuing surface of 3ª. Approximately midway between the ends of pipe 4 are perforations 4ª extending through its walls. Immediately below these perforations the outside surface is threaded at 4ᵇ. In assembling, pipe 4 is screwed into 3ª so that the bottom of Fig. 4 in place is continuous with the bottom of cylinder 3 in place.

Fig. 5 shows a disc 5 of suitable thickness, with a hole 5ª in the center.

The interior of the hole 5ª is threaded and the hole 5ª is commensurate in diameter with the outside diameter of pipe 4. In assembling, disc 5 is placed around pipe 4 by use of the central hole 5ª.

Fixity is established by screwing the two pieces, pipe 4 and disc 5, together at 4ᵇ.

Fig. 6 shows a pipe 6 threaded at the lower end 6ᵃ. The outside diameter of pipe 6 conforms with the inside diameter of pipe 4. In assembling, Fig. 6 is screwed into the top of pipe 4, and is inserted to a point immediately above the holes 4ᵃ.

Cap B, forming the top of reaction zone A, Fig. 2, is supplied with two additional exits, R and S Fig. 2.

The exits connect respectively with pipes U and V, Fig. 2, which lead bottomward of the device and connect with pipe W. There is a closed joining at X preventing communication between pipe W and special T O.

Pipe W proceeds downward and near its lower extremity supports a burner top Aᵃ, and a burner base Aᵇ. Openings Aᶜ between the burner top and base communicate with the interior of pipe W.

Toward the lower end of pipe W external threads are supplied and adjusted so that burner base Aᵇ may be raised or lowered for regulation purposes through increase or decrease of the distance between burner top Aᵃ and burner base Aᵇ.

Pipe W is closed at its bottom by cap, plug or otherwise, and is equipped with diversion pipe and valve Wᵃ Fig. 1.

Z, Fig. 1, indicates a washer made of suitable insulating material at the top of reaction zone A and below special T J.

The construction outlined by the drawings attached, may be supplemented by the addition of any suitable insulating material at localities as desired.

No method of support for the device has been shown but this may be by any suitable means.

There may be suitable openings at desired points provided in chamber C, allowing access to the interior of the reaction zone.

Addition may also be made of screens, traps, one way cocks and valves at selected localities as desired and the apparatus may be surrounded by such walls for operation as selected. Any support required by the coil may be supplied. The gas passages U and V may be changed into coils or other forms when found desirable, and the location of by-pass Wᵃ may be suitably changed or any desired number of such passes installed.

Such gaseous products as are diverted may be run through condensers, not shown, and operation of the process may be regulated for recovery of liquid condensates.

In operation, a quantity of inflammable material is supplied within cup base Aᵇ and ignited. When the apparatus is sufficiently heated there is delivered into pipe H oil quantities and into pipe I water. The quantity of each is determined by the capacity of the apparatus and analysis of the oil. The co-efficient in water quantity required to react the oil supply into desired gases or vapors or both by the process presented herein furnishes the proportionate quantities.

The water passes through pipe I into special T J and into pipe L. The oil passes through pipe H and is delivered into the top of reaction zone A. The location of pipe H within pipe I and T J is to maintain the temperature of the oil below cracking point until delivery into the reaction zone A.

The water through pipe K then enters coil L heated by combustion in burner base. Passing through coil L the water is converted into superheated steam of high degree and delivered into special T O through pipes M and N.

Within special T O are the assembled and installed units, shown in Figs. 3—4—5 and 6.

The steam quantities supplied are separated into divided and variously directed courses. An upward perpendicular jet of steam is projected from the upward terminus of pipe 6. The circular shoulder produced by the other terminus of pipe 6 within pipe 4 above the exit holes in pipe 4, 4ᵃ augments steam sprays through the holes 4ᵃ over upper surface of disc 5.

The steam passing through the circle of openings through cylinder 3, 3ᵇ finds exit beneath disc 5 where it is deflected outward, and proceeds as a blanket imposed upon the interior of the reaction zone A.

Opposed to the delivery of steam at the bottom of the reaction zone A is the introduction thereto of oil at the top through pipes H and D.

In the operation of the process, the following temperatures of the oil and water are prescribed; for the oil below cracking; for the water at or above oxide reaction requirements. The conditions are met in the operation of the apparatus supplied. Intimacy of contact is established by the method of steam delivery and unreacted oil quantities are preserved from superheated metallic contact by the interposition of sheets of reactively hot steam. Contact with the latter makes gas, with the former, fixed carbon and hydrogen in addition to gas.

The steam blanket within the reaction zone is maintained close upon and in direct contact with the inner surface of the bounding shell. The contour of the zone walls and the method and force of the steam's injection convert incident propulsion to adherence.

The superheated walls of the reaction zone contacting the incumbent sheets of steam, constantly transfer heat values, maintaining thereby reactive temperature within the steam.

Oil may not contact the superheated metallic surfaces because of the interposed and reactively hot steam blanket.

Before oil within the zone may reach crackingly hot metal, it is in gaseous state so formed under the prescribed methods of the process presented.

Use of the steam blanket described permits closer proximity of the walls of the reaction zone. Where space will permit the walls of the reaction zone may be installed sufficiently remote from the delivery point of the oil that the latter's conversion into gases and vapors in accordance with the process occurs prior to any possible contact with the oil and the confining walls.

The products of reaction in zone A are then conducted through openings R and S Fig. 2 through pipes U and V into pipe W. This transit is through a very hot locality and certain fixation may be expected en route. Regulation of adjustments and operation should be made to avoid the excessively high temperatures at which hydrocarbon gases react among themselves into naphthalene vapors. The above-mentioned secondary reactions impairs combustion recovery. For best results, operating temperatures should be within the range of steam reactivity temperatures as the minimum, and the temperatures causing naphthalene and reverse reactions as the maximum.

The extremely hot gases delivered into pipe W gain exits through the holes in pipe W, $A^c$ and are delivered into the burner formed by cap $A^a$ and base $A^b$.

Ignition of the gases thus emanating supplants the need of the initial starting material fired in burner base $A^b$ and the process of gas manufacture and its combustion proceeds.

Pipe and petcock $W^a$ are shown fitted to pipe W. The function of this attachment is to conduct gaseous and vaporous products from the apparatus for combustion or other use elsewhere. The diversion may be made at any suitable location other than shown, or from any number of such locations.

The materials used in the construction of the apparatus are of any suitable composition to withstand the conditions of heat required and avoid oxidization and corrosion.

It is to be observed that the gas is delivered to the burner at high temperature for combustion.

Boiling points of oil compounds may be advanced, and greater intimacy of contact between oil and steam established by use of pressure in operation when desired.

Comment.

It is to be observed that light petroleum fractions occur in small quantities in most grades of fuel oil and to a slight extent in the heavy crude oils generally used for fuel purposes. Such light fractions possess low boiling points but require very high temperatures to effect their cracking or to even unstabilize them. This is particularly true of light liquid paraffines such as pentane, hexane and octane.

Such compounds upon entering a reaction zone, such as is provided by this process, immediately assume vapor phase and escape in that state through exits provided. It is to be understood that in operating the device shown for heat producing purposes that the presence of such vapors in the product gases is not an impairment of the process presented, nor the gas and vapor making theory upon which the claims are based.

Certain temperature regulations are imperative to proper operation of the apparatus.

Heavy gravity, high boiling point oils possess fractions which crack and deposit carbon at temperatures less than the temperatures required for vaporization. The temperature maintained by this process for the oil at its point of delivery for reaction, and within the delivery line leading thereto, insures a condition of heat below the cracking points of such compounds.

Were heavy oil quantities, though delivered with observance of the above precaution, permitted, even in the presence of steam, to attain through gradation high temperature for instance 1000° F. cracking and carbon precipitation would follow. When, with a rising degree of heat the cracking temperature of some particular compound was attained, it would crack and in cracking would deposit carbon.

Steam is not a deterrent to such carbon depositing unless heated to a higher degree, namely to a temperature at which its oxygen is available for reaction with carbon into monoxide and dioxide resultants. Successful operation of back-runs and similar methods in artificial gas manufacture serve to illustrate.

Hence, steam temperatures within the reaction zone prescribed by the process, are maintained at such intensity that oxygen is available for reaction with carbon.

It is within the scope of this invention to cause the vapors and gases produced in the reaction zone to be conveyed therefrom and condensed, whereby liquefiable products are recovered, and such portion of the gaseous residue as required may be returned and combusted proximate to the reaction zone to afford required heat for the reactions.

Complete reaction of the entire oil mass supplied, immediately upon its contacting the intensely hot steam quantities, is not possible. Necessary contact is not available. The low heat conductivity of hydrocarbons, however, causes reaction between contacting molecules of oil and steam rather than excessive heat conduction to other oil molecules within chamber C.

The time element and intimacy of contact incidental to all reactions is provided for in the apparatus outlined. The steam currents within reaction zone A cause comingling and intimacy of contact between the oil and the reactively hot steam and though the apparatus prescribes, of necessity, definite courses to be followed during the establishment of reaction contact any diversion of the materials to courses other than shown, which subserves the purpose, are within the scope of the specification.

By regulation of the quantities of water and oil supplied, composition of the oil, and temperatures maintained, the resultants may vary widely in the percentage of carbon oxides present and the gravities of the hydrocarbons. The latter may range in their composition from methane the lightest of the paraffine gases to and including hydrocarbons which are liquid at atmospheric pressure and temperature, and the variations in the relative quantities of the hydrocarbon products may be numerous.

It is within the scope of the process presented to recover and condense any hydrocarbon vapors which may be produced through contacting of reactively hot steam and oil without carbon deposit.

The apparatus indicated by the drawings herewith is submitted as one means of applying the process set forth. Any apparatus suitable for application and operation of the process is intended to be included within the specification. For instance: the use of a ring at the interior bottom of reaction zone A in lieu of the arrangement of piping shown, such ring permitting the passage of steam through its center upward and between its lower surface and the interior of the zone to form the steam blanket.

The process incorporates the use of intervening steam walls by which gas reaction is substituted for carbon deposit which would occur upon the metallic surfaces but for the steam blankets. Steam jets may be established in lieu of the method for steam delivery shown. Such jets deliver steam at spaced intervals along the walls of chamber C and with such spray formation that juncture is effected of the sprays from the jets and an intervening contiguous steam cloud established between the oil and the heated surfaces. Orifice design and nozzle flow lines are readily established to serve this purpose. The method presented in the apparatus shown is regarded as preferable, but may be supplanted in any apparatus design serving adaptation in its operation of the process presented.

It may be helpful in presenting this process to illustrate its application, by reacting a certain water quantity with a certain oil quantity in an apparatus as shown by the drawings.

The data, calculations and reactions shown are not presented as infallible but as sufficiently close to the accurate to subserve practical illustration.

The results show direct reaction, molecular non-stabilization and readjustment, with elimination of oil cracking by its contact with superheated steam.

Analysis of the oil following is on file at the offices of the Westchester Lighting Company, New York, under date of July 31, 1923. The gravities shown are A. P. I. standard at 60°.

Gravity _____ 33.2 (.8594)
Initial boiling point_____ 432° F.
400°–500° F. 9.0% _____ 42.4 (.8137)
500°–600° F. 33.0% _____ 38.3 (.8332)
600°–700° F. 37.0% _____ 32.6 (.8622)
Residuum 21.0%_____ 29.6 (.8781)
Sulphur by weight_____ .039%
Water undissolved_____ none
Flash point (tag closed)_____ 172° F.
B. t. u. per pound_____ 20,180

Hydrogen content of the oil is calculated at 12% and eliminating a small correction for sulphur the carbon content is 88%.

Reacting 85 pounds, about 12 gallons, of this oil with 18 pounds of water in accordance with the process herein set forth presents the following:

| | Lbs. | C. lbs. | H. lbs. | O. lbs. |
|---|---|---|---|---|
| Oil | 85 | 74.8 | 10.2 | |
| Water | 18 | | 2 | 16 |
| Total | 103 | 74.8 | 12.2 | 16 |
| | reacted into | | | |
| Carbon monoxide CO | 28 | 12 | | 16 |
| Methane $CH_4$ | 20.34 | 15.25 | 5.09 | |
| Ethane $C_2H_6$ | 4 | 3.2 | .8 | |
| Ethylene $C_2H_4$ | 3.71 | 3.18 | .53 | |
| Butylene $C_4H_8$ | 15.11 | 12.95 | 2.16 | |
| Propylene $C_3H_6$ | 7.78 | 6.67 | 1.11 | |
| Benzene $C_6H_6$ | 12.37 | 11.49 | .88 | |
| Toluene $C_7H_8$ | 10 | 9.14 | .86 | |
| Hydrogen | .69 | | .69 | |
| Oil vapors | 1 | .92 | .08 | |
| Total | 103 | 74.8 | 12.2 | 16 |

The above quantitative amounts are in weight balance with oil and water supplied. The thermal value and volume of the reaction gases above shown follows; B. t. u. values are based upon a table of constants compiled by the United Gas Improvement Co., 60° F. and 30″ pressure. Temperature of combustion products reduced to 18° C.

| | Lbs. | Volume cu. ft. | B. t. u. |
|---|---|---|---|
| CO | 28 | 378 | 132,304 |
| $CH_4$ | 20.34 | 480 | 484,865 |
| $C_2H_6$ | 4 | 50 | 88,894 |
| $C_2H_4$ | 3.71 | 50 | 78,505 |
| $C_4H_8$ | 15.11 | 100 | 315,995 |
| $C_3H_6$ | 7.78 | 70 | 164,313 |
| $C_6H_6$ | 12.37 | 60 | 228,189 |
| $C_7H_8$ | 10 | 40 | 186,990 |
| H | .69 | 129 | 42,450 |
| Vapors | 1 | 30 | 18,302 |
| Total | 103 | 1,387 | 1,730,907 |

Contrasted with the above recovery is the

B. t. u. value of the oil as before given, namely: 20,180 B. t. u. per pound, or 20,180×85=1,715,300 B. t. u.

The above totals for all practical purposes are in heat balance.

The gas produced in the foregoing illustration of operation is extremely hot.

$\frac{1,730,807}{1387}$ about 1250 B. t. u. per foot.

When the process is applied to gas manufacture, for general distribution, such rich products may be used for mixing with lower heat value gases such as water gas and by-product gases from ovens, etc.

It will be found, however, that the process may be operated, to produce larger gas quantities of lower thermal value. The same quantity of oil shown above reacted with 67.19 pounds of water under conditions causing reaction to methane, carbon monoxide and free hydrogen presents the following:

|  | Lbs. | C. lbs. | H. lbs. | O. lbs. |
|---|---|---|---|---|
| Oil | 85 | 74.8 | 10.2 |  |
| Water | 67.19 |  | 7.46 | 59.73 |
| Total | 152.19 | 74.8 Reacted into | 17.66 | 59.73 |
| CO | 104.53 | 44.8 |  | 59.73 |
| Methane | 40 | 30 | 10.00 |  |
| Hydrogen | 7.66 |  | 7.66 |  |
|  | 152.19 | 74.8 | 17.66 | 59.73 |

|  |  | Volume cu. ft. | B. t. u. |
|---|---|---|---|
| CO | 104.53 | 1,411 | 456,685 |
| Methane | 40 | 944 | 953,520 |
| Hydrogen | 7.66 | 1,440 | 471,266 |
|  | 152.19 | 3,795 | 1,881,471 |

The volume of gas has been increased from 1387 cu. ft. to 3795 cu. ft. and the B. t. u. been reduced from 1250 to about 500 per cu. ft.

The same adjustment and regulation of the thermal value of the gas produced pertains to the operation of the compact unit, serviceable as an oil burner and shown by the drawings attached hereto.

The adjustment becomes important in relation to the spread of heat desired. Decrease of proportionable water supply intensifies flame temperature and confines the heat area. Increase of the water proportion increases the direct heat zone and reduces the temperatures about the burner.

It is to be observed that such gases as are combusted in heated condition increase normal thermal recovery and more than compensate for endothermic requirements of manufacture.

The process presented contemplates true gas manufacture and presents economies and conveniences to the general art. Adaptation of the process and a method of operation is shown in a device so compact and simplified as to serve the purposes of an oil burner. Provision is made for conducting gas away from its point of manufacture for use elsewhere.

The process prescribes no cracking of oil in delivery lines. The premise is that heavy oil fractions crack before vaporizing. Liquid phase delivery is prescribed with the oil at a temperature below the cracking point of heaviest fractions.

The process provides for contact between oil and water to be had with the water as steam superheated to reaction temperature.

It has been stated heretofore that steam contacted at or about the vaporization temperatures of the oil or contacted and the temperature raised to the steam's reaction requirements fails to prevent fixed carbon deposits, as steam is inert to prevent carbon deposit until its reaction temperature is reached, when carbon which would otherwise be deposited is reacted into carbon oxide gases. Carbon deposit incident to vapor phase cracking is as familiar as it is in the liquid phase.

A method for applying the process is shown by which reactively hot steam is constantly interposed between oil quantities and superheated surfaces. This prevents cracking by contact of oil with such surfaces, and as the intervening steam is reactively hot, gas formation not carbon deposit ensues.

The providing of an intervening wall of steam between oil quantities and superheated surfaces, permits delivery of gas making heats by solid superheated materials to oil through steam, without carbon deposit.

In adaptation to oil burners, the process attains almost theoretical completeness of combustion through gas manufacture, without carbon deposit, to the exclusion of sprays, mists, emulsions and fogs.

In oil burner adaptation, the gas making reaction requirements of heat may be afforded by combustion of the gas made and normal thermal recovery is augmented by burning the gas at high temperature.

The process may be applied with economies to the operation of public utility stations whereby from a combustion zone, heat values are produced for steam making and electric current generation, conjointly, with the manufacture of artificial gas which may be delivered for storage and distribution.

In addition to fuel cost reduction, flexibility of operation commends use of the process for marine and locomotive purposes; flame spread and temperature being subject to immediate change and regulation in such application.

Intimacy of contact may be increased between reaction quantities by use of pressure in operation.

When use is made of the term "without carbon deposit" or the like, in the specification and claims hereof, it is to be understood as meaning that no material or substantial amount of carbon is deposited, to the extent of interference with operation of the process.

Having described my invention, what I claim as new and desire to secure by Letters Patent, is:

1. A process of cracking and converting hydrocarbon oil, which consists in continuously introducing hydrocarbon oil into an enlarged zone, and continuously and separately introducing into said zone substantially undiluted steam of such volume and at such temperature that such carbon as is released by the cracking of the hydrocarbon oil is converted into carbon oxides by union with oxygen from the steam before such carbon can be deposited upon the zone wall, the specific gravity of the resulting hydrocarbons being lowered by the reactions.

2. The process of cracking hydrocarbon oils which consists in providing an enlarged zone heated above the cracking temperature of the hydrocarbon oil to be employed and of sufficient size to permit the reactions hereinafter mentioned, introducing hydrocarbon oil at a temperature below the cracking temperature of the heaviest fractions thereof at a point away from the heated walls of the zone, providing within the zone and around the oil as introduced substantially undiluted steam of a temperature and quantity sufficient to crack the oil and thereupon to react such carbon as is released therefrom before such carbon can be deposited upon the zone wall, whereby substantially all the hydrocarbon introduced passes out of the zone as carbon oxides and hydrocarbons of lighter gravity than those introduced.

3. A process for producing lighter hydrocarbon oils from heavier ones, which consists in converting water into substantially undiluted steam; superheating the steam to a temperature at which, with carbon contact, carbon oxides are produced; contacting such steam with hydrocarbon oil; cracking the oil with heat supplied by the contacting steam; reacting the carbon, released from the oil by the cracking, with oxygen of the steam into carbon oxides; reacting hydrogen released from the steam, in the formation of carbon oxides, with unstabilized hydrocarbons present; and confining the reacting substances within a zone so enlarged that oil quantities supplied and such carbon as is released by cracking may not reach the confining walls before the reactions mentioned take place; whereby, the oil introduced into the reaction zone emanates therefrom as carbon oxides and hydrocarbon compounds of reduced gravity.

4. A process for manufacturing lighter hydrocarbons from heavier hydrocarbon oils with combustible gaseous by-products; which consists in converting water into substantially undiluted steam; superheating the steam to a temperature, at which, with carbon contact, carbon oxides are produced; contacting such steam with hydrocarbon oil; cracking the oil with heat supplied by the contacting steam; reacting the carbon, released from the oil by the cracking, with oxygen of the steam into carbon oxides; reacting hydrogen released from the steam, in the formation of carbon oxides, with unstabilized hydrocarbons present; and confining the reacting substances within an enlarged zone in which only steam may contact the heated confining walls, and conducting the oil, introduced into the zone, therefrom, as carbon oxides, hydrocarbon gases and vapors.

5. A process for manufacturing lighter hydrocarbon oils from heavier hydrocarbon oils with combustible gaseous by-products; which consists in contacting in an enlarged confined space hydrocarbon oils and steam undiluted with substantial amounts of water gas, the former introduced thereinto below the cracking temperature of its heavy fractions, and the steam at a superheated temperature, at which the formation of carbon oxides and hydrogenization of unstabilized hydrocarbon compounds results; and establishing the reaction zone within such confined space about the point at which the oil is introduced in such manner that unreacted oil quantities and such carbon as is released may not contact any confining walls possessing a temperature the equal of or above the cracking point of the hydrocarbons, whereby, without carbon deposit due to cracking, the oil quantities introduced into the zone are conducted therefrom as carbon oxide gases, hydrocarbon gases and vapors.

6. A process for the manufacture of carburetted water gas with liquid hydrocarbon by-products from petroleum and its heavier fractions and water; which consists in establishing an enlarged reaction zone; introducing thereinto petroleum or its heavier fractions; contacting the introduced oil with separately introduced and substantially undiluted steam, superheated to water-gas reaction requirements; cracking the oil by contact with the steam; reacting the carbon released by cracking of the oil, with the steam into water gas before the same can be deposited upon the reaction zone wall; hydrogenizing some of the unstabilized hydrocarbons into hydrocarbon gases with hydrogen, made available, in uncombined state, in the water gas produced; and preventing any cracking of the introduced oil by any contact with the hot confining walls, whereby the oil introduced is conducted from the zone as water gas and vapors condensable into hydrocarbon liquids.

7. A process for reducing the gravity of the heavier fractions of petroleum which consists in contacting and reacting hydrocarbon oil introduced at a temperature below the cracking point of its heavy fractions and substantially undiluted steam within an enlarged zone at such temperature that cracking occurs within the oil upon such contact and carbon, released by such cracking, is reacted into carbon oxides by union with oxygen from the steam, whereby carbon deposit upon confining walls sufficiently hot to crack the oil is prevented by the reaction of the oil with the steam prior to possible contact of said oil with said confining wall, the carbon content of the oil being reduced and its gravity lessened.

8. A process for reducing the gravity of the heavier fractions of petroleum which consists in continuously and separately introducing substantially undiluted steam and hydrocarbon oils into a zone sufficiently hot to produce the reactions hereinafter mentioned, said zone being confined by walls heated beyond the cracking temperature of the heavy oil fractions introduced, such walls being maintained free from carbon deposit by establishing currents of reactively hot steam within the zone and by reacting carbon from the oil with the oxygen from said steam and incorporating the hydrogen released from the steam with unstabilized hydrocarbon compounds present, whereby oil introduced is reduced in gravity and the walls of the reacting zone are maintained free from carbon deposit.

9. A cracking process in the heat treatment of hydrocarbon oils which consists in reacting steam of sufficient volume and temperature for the desired reactions and hydrocarbon oils within an enlarged zone to produce carbon oxides and to hydrogenize unstable hydrocarbon compounds present within said zone; the hydrocarbons delivered into said zone being maintained at temperatures below the cracking point of the heavy fractions thereof until delivery into said zone and the steam, substantially undiluted, being delivered separately from the oil, the walls confining the zone being maintained free from carbon deposit by currents of said steam established therein and by occurrence of the reactions recited, whereby, without carbon deposit within the oil delivery lines or its accumulation upon the confining walls of the zone, heavier hydrocarbon oils are converted into lighter hydrocarbon oils.

10. A process for heat treatment of hydrocarbon oils in a zone in which steam and hydrocarbon oil are separately introduced which consists in introducing hydrocarbon oil into a zone surrounded by a continuous and moving steam curtain of such temperature and volume that it performs the following functions: cracks the hydrocarbons introduced; reacts carbon released from the hydrocarbons by cracking, into carbon oxides; hydrogenizes unstabilized hydrocarbon compounds present with hydrogen released from steam; and prevents passage of carbon and oil through the steam curtain by these reactions.

11. A process for the heat treatment of hydrocarbon oil in a zone in which steam and oil are separately introduced which consists in establishing upon interior surfaces of confining walls of a reaction zone a continuous, travelling, incumbent steam curtain of sufficient volume and temperature to produce the following results upon the hydrocarbon oils introduced into the zone: crack the hydrocarbons; react the carbon released by said cracking into carbon oxides; hydrogenize the unstable hydrocarbon present with hydrogen released from the steam; and prevent carbon deposit upon the walls of the zone by occurrence of the above reactions whereby hydrocarbons introduced are converted into gases and vapor.

12. A process for cracking hydrocarbon oils in an enlarged zone which consists in externally imparting heat to such zone through its walls sufficient to crack the oil and to produce reactions to carbon oxides between the carbon released from the oil by cracking, and substantially undiluted steam separately introduced into said zone, said steam being of sufficient volume and temperature to produce the reactions described, the inner surfaces of the confining walls of said zone being maintained free from carbon deposit by the before indicated reaction and by the interposition between such walls and the introduced hydrocarbon oil of a moving steam blanket.

13. A process for preventing carbon accumulation in the heat treatment of the heavier fractions of petroleum which consists in continuously delivering through water jacketed delivery lines hydrocarbon oils into a zone and in said zone contacting the same with steam sufficiently hot to crack the oil and produce reactions to carbon oxides between the carbon released by said cracking and the oxygen of the steam, and also to produce hydrogenization of the unstable hydrocarbons by the hydrogen released from the steam, said zone being confined within walls heated beyond the cracking temperature of the heavy oil fractions introduced, and maintaining such walls free from carbon deposit by establishment of currents of hot steam within the zone, whereby hydrocarbons introduced are reduced in gravity and carbon accumulation is prevented in delivery lines and upon the interior of the walls of the reaction zone.

14. A process of cracking and converting hydrocarbon oil which consists in continuously introducing hydrocarbon oil at a temperature below the cracking point of its heavy fractions into an enlarged externally heated zone, and continuously and separately introducing into said zone substantially undiluted steam of such volume and at such temperature, maintained by walls of said externally heated zone, that such carbon as is released by the cracking of the hydrocarbon oil is converted into carbon oxides by union with oxygen from the steam before such carbon can be deposited upon the zone wall, the specific gravity of the hydrocarbons being lowered by the reactions.

In testimony whereof I affix my signature.

HAROLD R. BERRY.